(12) United States Patent
Chang

(10) Patent No.: US 11,143,842 B2
(45) Date of Patent: Oct. 12, 2021

(54) OPTICAL LENS

(71) Applicants: SINTAI OPTICAL (SHENZHEN) CO., LTD., ShenZhen (CN); ASIA OPTICAL CO., INC., Taichung (TW)

(72) Inventor: An-Kai Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 67 days.

(21) Appl. No.: 16/719,983

(22) Filed: Dec. 19, 2019

(65) Prior Publication Data
US 2020/0301102 A1 Sep. 24, 2020

(30) Foreign Application Priority Data
Mar. 19, 2019 (CN) .......................... 201910208196.6

(51) Int. Cl.
*G02B 9/12* (2006.01)
*G02B 13/00* (2006.01)
*G02B 13/06* (2006.01)
*H04N 5/225* (2006.01)

(52) U.S. Cl.
CPC ........... *G02B 9/12* (2013.01); *G02B 13/0035* (2013.01); *G02B 13/06* (2013.01); *H04N 5/2254* (2013.01)

(58) Field of Classification Search
CPC ...... G02B 9/12; G02B 13/0035; G02B 13/06; G02B 13/18; G02B 9/34–58; G02B 13/004; G02B 3/04; H04N 5/2254; G06K 9/00046

USPC ........ 359/784, 788, 790, 644–645, 660–661, 359/682, 686, 689, 715–716, 734–735, 359/748, 753, 771, 781
See application file for complete search history.

(56) References Cited

U.S. PATENT DOCUMENTS

| 2017/0017060 A1* | 1/2017 | Liu ...................... G02B 13/004 |
| 2018/0231747 A1* | 8/2018 | Takada ............... G02B 13/0035 |
| 2019/0033559 A1* | 1/2019 | Chang ..................... G02B 9/64 |
| 2019/0302421 A1* | 10/2019 | Chang ............... G02B 13/0045 |

FOREIGN PATENT DOCUMENTS

| TW | 201706657 A | 2/2017 |
| TW | M569426 U | 11/2018 |

OTHER PUBLICATIONS

TWM569426—English Machine Translation (Year: 2018).*

* cited by examiner

*Primary Examiner* — Thomas K Pham
*Assistant Examiner* — Alberto J Betancourt
(74) *Attorney, Agent, or Firm* — Mark M. Friedman

(57) ABSTRACT

An optical lens includes a first lens, a second lens and a third lens in an order from an object side to an image side along an optical axis. The first lens is a lens having negative refractive power, and an object-side surface of the first lens is concave; the second lens is a lens having positive refractive power, and an image-side surface of the second lens is convex; the third lens is a lens having positive refractive power, and an image-side surface of the third lens is convex. The optical lens satisfies a condition. i.e., 3<D1/f<6, wherein D1 is an optical effective diameter of the first lens and f is effective focal length of the optical lens. The optical lens is characterized by wide-angle and short distance.

20 Claims, 13 Drawing Sheets

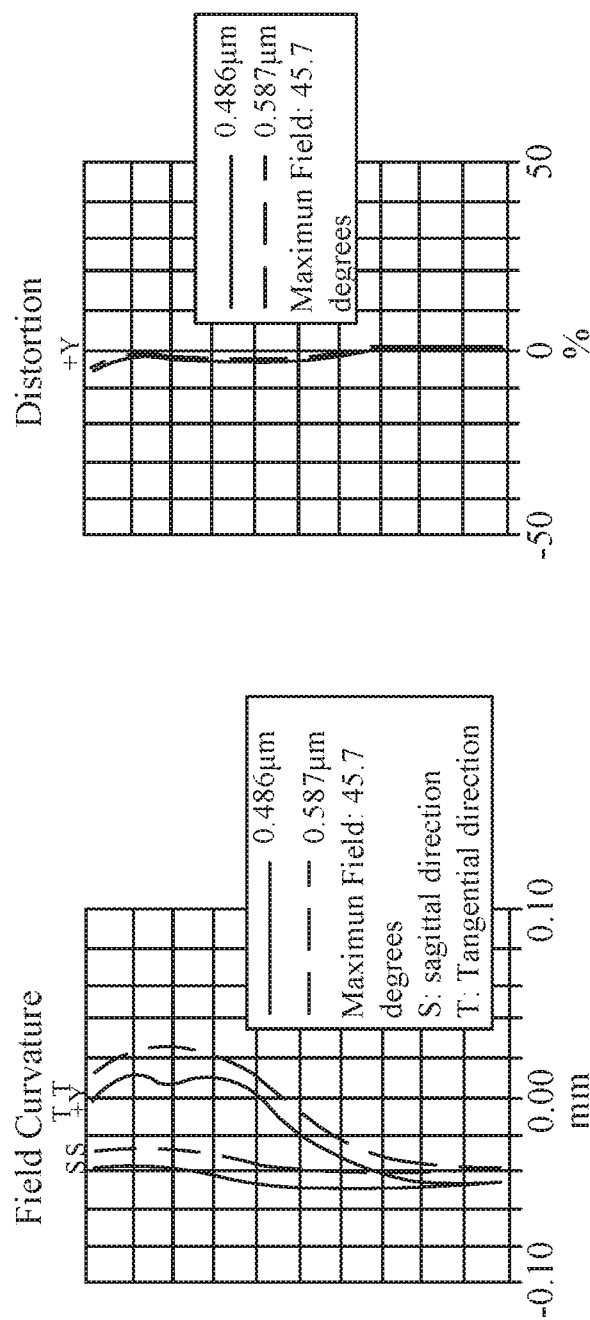

OPTICAL LENS

TECHNICAL FIELD

The present invention relates to an optical component, and more particularly to an optical lens.

BACKGROUND

In recent years, image capturing devices are widely applied. Various smart apparatuses such as smartphones, tablets and wearable apparatuses are equipped with image capturing devices. An electronic apparatus is even equipped with a plurality of image capturing devices or optical lenses. Also, optical image capturing systems are gradually developed with different properties for serving different needs.

For instance, in operating the smart apparatuses, it needs users to authenticate their identities in order to prevent the apparatuses from being used falsely. In addition to inputting an account name and a password traditionally, using fingerprint recognition becomes popular gradually for identity authentication. This approach is more convenient and rapid. In smart apparatus applications, common capacitive-type fingerprint recognition is developed well. However, the capacitive-type fingerprint recognition has to set an additional fingerprint recognition region on the apparatus and cannot be directly disposed beneath a display panel. Under-display fingerprint recognition can be achieved by optical fingerprint recognition. In this approach, the image capturing device or the optical lens is disposed beneath the display panel for capturing fingerprint images. Accuracy of the fingerprint recognition is affected by the optical lens. Therefore, developing such an optical lens becomes an important issue in this field.

SUMMARY

The objective of the present invention is to provide an optical lens with wide-angle and short object distance, suitable for optical recognition, micro observation and biomedical testing.

In an aspect, the optical lens provided in the present invention includes a first lens, a second lens and a third lens in an order from an object side to an image side along an optical axis. The first lens is a lens having negative refractive power, and an object-side surface of the first lens is concave; the second lens is a lens having positive refractive power, the third lens is a lens having positive refractive power, and an image-side surface of the third lens is convex. The optical lens satisfies a condition, i.e., $4<TTL/f<7$, wherein TTL is the total length of the optical lens and f is effective focal length of the optical lens.

In an embodiment of the present invention, at least one of the object-side surface and an image-side surface of the first lens has a point of inflection, and the image-side surface of the first lens is concave, the first lens is a biconcave lens.

In an embodiment of the present invention, an object-side surface of the second lens is concave and an image-side surface of the second lens is convex, and the second lens is a meniscus lens.

In an embodiment of the present invention, an object-side surface of the third lens is convex, the third lens is a biconvex lens.

In an embodiment of the present invention, the optical lens satisfies a condition. i.e., $3<D1/f<6$, wherein D1 is an optical effective diameter of the first lens and f is effective focal length of the optical lens.

In an embodiment of the present invention, the optical lens satisfies a condition, i.e., $3.2<D1/IH<3.8$, wherein D1 is the optical effective diameter of the first lens and IH is a maximum image height on an image plane carried out by the optical lens.

In an embodiment of the present invention, the optical lens satisfies a condition, i.e., $10<f2/f<14$; and $8.5<(f1+f2+f3)/f<15$, wherein f1 is effective focal length of the first lens, f2 is effective focal length of the second lens, f3 is effective focal length of the third lens, and f is effective focal length of the optical lens.

In an embodiment of the present invention, the optical lens satisfies a condition, i.e., $4<TTL/AAG<7$, wherein TTL is the total length of the optical lens, and AAG is a sum of an air gap, along the optical axis, between the first lens and the second lens and an air gap, along the optical axis, between the second lens and the third lens.

In an embodiment of the present invention, the optical lens satisfies a condition, i.e., $0.7<OD/TTL<1.2$, wherein OD is a distance, along the optical axis, between the object-side surface of the first lens and a to-be-detected object, and TTL is the total length of the optical lens.

In an embodiment of the present invention, the optical lens satisfies a condition, i.e., $5<f2/f3<10$, wherein f2 is effective focal length of the second lens and f3 is effective focal length of the third lens.

In an embodiment of the present invention, the optical lens satisfies a condition, i.e., $4<f/TC23<6$, wherein f is effective focal length of the optical lens and TC23 is a distance, along the optical axis, between an image-side surface of the second lens and an object-side surface of the third lens.

In an embodiment of the present invention, the optical lens further includes an aperture stop disposed between the second lens and the third lens, wherein the optical lens satisfies a condition, i.e., $0.5<SD/T1<1$, wherein SD is a distance, along the optical axis, between the aperture stop and the image-side surface of the third lens, and T1 is central thickness of the first lens along the optical axis.

In another aspect, the optical lens provided in the present invention includes a first lens, a second lens and a third lens in an order from an object side to an image side along an optical axis. The first lens is a lens having negative refractive power, and an object-side surface of the first lens is concave; The second lens is a lens having positive refractive power, and an image-side surface of the second lens is convex; the third lens is a lens having positive refractive power, and an image-side surface of the third lens is convex. The optical lens satisfies a condition, i.e., $3<D1/f<6$, wherein D1 is an optical effective diameter of the first lens and f is effective focal length of the optical lens.

In an embodiment of the present invention, at least one of the object-side surface and an image-side surface of the first lens has a point of inflection, and the image-side surface of the first lens is concave, the first lens is a biconcave lens; an object-side surface of the second lens is concave, the second lens is a meniscus lens; an object-side surface of the third lens is convex, the third lens is a biconvex lens.

In an embodiment of the present invention, the optical lens satisfies a condition, i.e., $0.7<OD/TTL<1.2$, wherein OD is a distance, along the optical axis, between the object-side surface of the first lens and a to-be-detected object, and TTL is the total length of the optical lens.

In an embodiment of the present invention, the optical lens satisfies a condition, i.e., $3.2<D1/IH<3.8$, wherein D1 is the optical effective diameter of the first lens and IH is a maximum image height on an image plane carried out by the optical lens.

In an embodiment of the present invention, the optical lens satisfies a condition, i.e., $8.5<(f1+f2+f3)/f<15$, wherein f1 is effective focal length of the first lens, f2 is effective focal length of the second lens, f3 is effective focal length of the third lens, and f is effective focal length of the optical lens.

In an embodiment of the present invention, the optical lens satisfies a condition, i.e., $4<TTL/f<7$, wherein TTL is the total length of the optical lens and f is effective focal length of the optical lens.

In an embodiment of the present invention, the optical lens satisfies a condition, i.e., $10<f2/f<14$; and $5<f2/f3<10$, wherein f2 is effective focal length of the second lens, f3 is effective focal length of the third lens, and f is effective focal length of the optical lens.

In an embodiment of the present invention, the optical lens satisfies a condition, i.e., $4<TTL/AAG<7$; and $4<f/TC23<6$, wherein TTL is the total length of the optical lens, AAG is a sum of an air gap, along the optical axis, between the first lens and the second lens and an air gap, along the optical axis, between the second lens and the third lens, f is effective focal length of the optical lens, and TC23 is a distance, along the optical axis, between the image-side surface of the second lens and an object-side surface of the third lens. The optical lens further includes an aperture stop disposed between the second lens and the third lens, and the optical lens satisfies a condition, i.e., $0.5<SD/T1<1$, wherein SD is a distance, along the optical axis, between the aperture stop and the image-side surface of the third lens, and T1 is central thickness of the first lens along the optical axis.

The optical lens of the present invention is capable of enlarging a field of view, reducing aberration and improving image resolving ability. Also, the optical lens of the present invention at least requires only three pieces of lenses, is characterized by a small number of lenses and easily to be manufactured in small size, and can be implemented in some applications to achieve under-display optical fingerprint recognition.

BRIEF DESCRIPTION OF THE DRAWINGS

FIGS. 5B to 5D are diagrams illustrating field curvature, distortion and transverse chromatic aberration according to the fourth embodiment of the present invention, respectively.

DETAILED DESCRIPTION

To make above objectives, features and advantages and others of the present invention more clearly and apparently, the present invention will be described in details below using embodiments in conjunction with the appending drawings.

The present invention provides an optical lens with wide-angle and short object distance, which can be implemented as a camera characterized by small size, single focal point and large aperture and is applicable to personal information terminals (e.g., cell phones, smartphones and tablets), wearable devices, and image capturing devices equipped with various cameras, and is implementable in fields of optical recognition, micro observation and biomedical testing. For example, the optical lens of the present invention can be disposed beneath a display panel to achieve under-display optical fingerprint recognition, and acts as a key component of relevant devices implementing the under-display fingerprint recognition.

The present invention provides an optical lens including a first lens, a second lens and a third lens in an order from an object side to an image side along an optical axis. The first lens is a lens having negative refractive power, and an object-side surface of the first lens is concave. The second lens is a lens having positive refractive power. The third lens is a lens having positive refractive power, and an image-side surface of the third lens is convex. The optical lens satisfies a condition. i.e., $4<TTL/f<7$, where TTL is the total length of the optical lens and f is effective focal length of the optical lens.

Figure 1:
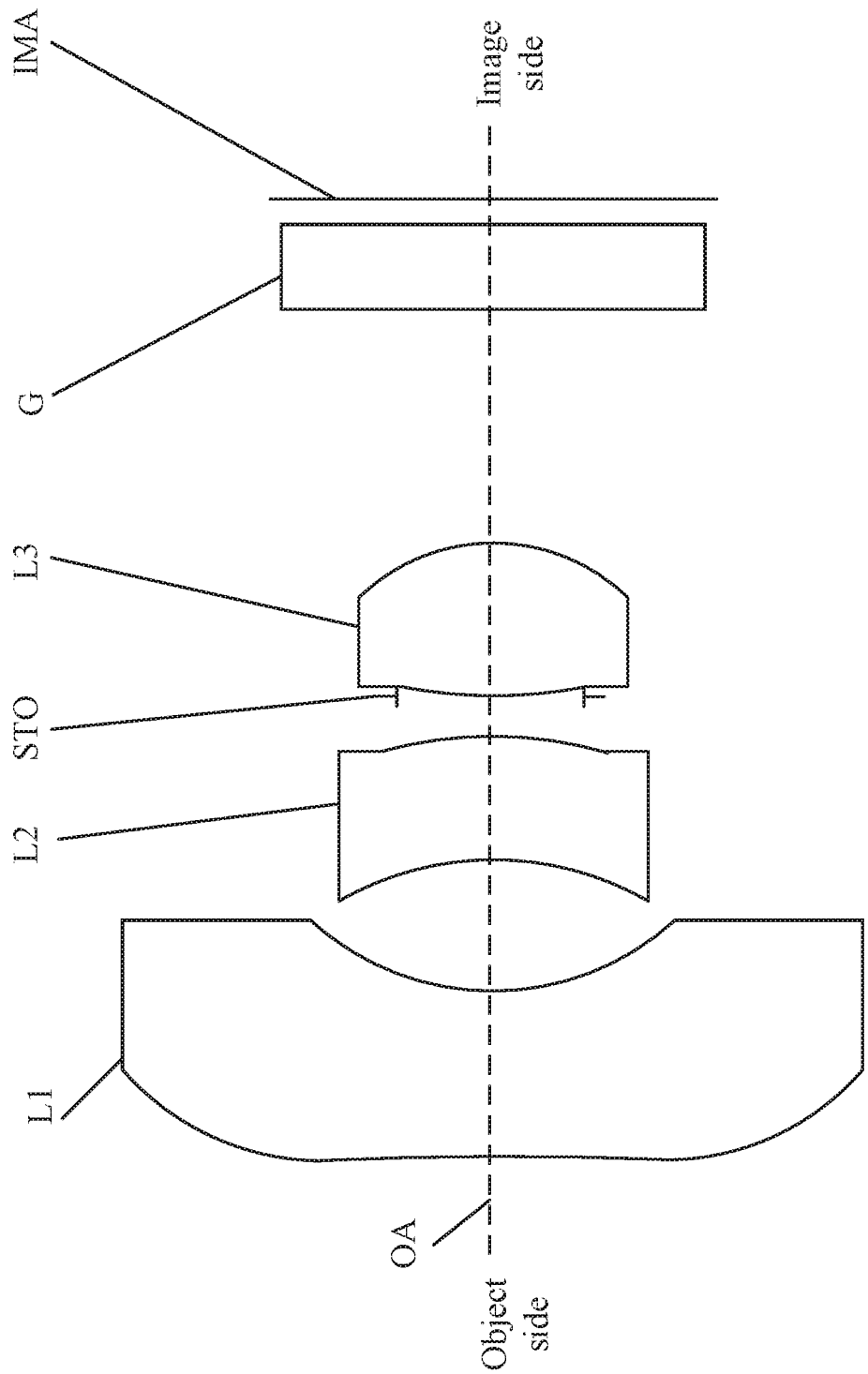
FIG. 1 is a schematic diagram showing an optical lens in accordance with the present invention.

Referring to FIG. 1, the optical lens of the present invention includes a first lens L1, a second lens L2 and a third lens L3 in an order from an object side to an image side along an optical axis OA. Preferably, the first lens L1 is a lens having negative refractive power, the second lens L2 is a lens having positive refractive power and the third lens L3 is a lens having positive refractive power. In addition, the optical lens further includes an aperture stop STO located between an image-side surface of the second lens L2 and an object-side surface of the third lens L3 and a protective glass G located between the third lens L3 and an image plane IMA (light rays from the object side eventually form an image on the image plane IMA). However, the position of the aperture stop STO is not limited to the aforesaid position. The aperture stop STO can be disposed at other suitable positions. The protective glass G can also be a filter.

In an embodiment, the optical lens has a single focal point as a single-focal-point optical lens. Along the optical axis OA, a flat transparent member (the material of which is glass, for example) can be disposed near the object side at a position distanced from the object-side surface of the first lens L1. A to-be-detected object may be placed on the flat transparent member so as to be imaged at a fixed object distance, thereby facilitating forming a clear image on the image plane IMA.

In an embodiment, the object-side surface of the first lens L1 is concave and the image-side surface of the first lens L1 is concave, thus forming a lens having negative refractive power. The first lens L1 may be made of a plastic material. At least one of the object-side surface and the image-side surface of the first lens L1 can be an aspheric surface (ASP).

The first lens L1 can also be a compound lens consisting of glass and plastic. For example, the object-side surface of the first lens L1 is made of a plastic material and the image-side surface of the first lens L1 is made of a glass material. In addition, at least one of the object-side surface and the image-side surface of the first lens L1 may have a point of inflection. For example, the point of inflection is located on the object-side surface of the first lens L1.

In an embodiment, the object-side surface of the second lens L2 is concave and the image-side surface of the second lens L2 is convex, thus forming a lens having positive refractive power. The second lens L2 can be made of a plastic material or is a compound lens consisting of glass and plastic. For example, the object-side surface of the second lens L2 is made of a glass material and the image-side surface of the second lens L2 is made of a plastic material.

In an embodiment, the object-side surface of the third lens L3 is convex and the image-side surface of the third lens L3 is convex, thus forming a lens having positive refractive power. For example, the third lens L3 is a biconvex lens. The third lens L3 can be made of a plastic material or is a compound lens consisting of glass and plastic. At least one of the object-side surface and the image-side surface of the third lens L3 can be an aspheric surface.

Both of the object-side surface and the image-side surface of each of the lenses L1. L2 and L3 of the optical lens can be aspheric surfaces. The use of aspheric surfaces can have more console variables to reduce aberration. Alternatively, each of the lenses L1, L2 and L3 can be a plastic lens, which may keep excellent image resolving quality while lowering the cost. Of course, each of the lenses L1, L2 and L3 can also be implemented by a glass lens or by a compound lens consisting of plastic and glass.

The shape of an aspheric lens can be expressed by the following formula:

$$D = \frac{C \cdot H^2}{1+\sqrt{1-(1+K) \cdot C^2 \cdot H^2}} + E_4 H^4 + E_6 H^6 + E_8 H^8 + E_{10} H^{10} + E_{12} H^{12}$$

wherein D represents the sag of a point on the aspheric surface at a height distanced to a central axis of the lens; C is a reciprocal of a paraxial curvature radius; FI represents a height of a point on the aspheric surface with respect to the central axis; K is the conic constant of the aspheric lens; and E4 to E12 are aspheric surface coefficients for even (greater than or equal to four) order terms.

The optical lens of the present invention is capable of enlarging a field of view, reducing aberration and improving image resolving ability. Also, the optical lens of the present invention at least requires only three pieces of lenses, is characterized by a small number of lenses and easily to be manufactured in small size, and can be implemented in some applications to achieve under-display optical fingerprint recognition.

The optical lens of the present invention will be further detailed with reference to the embodiments in the followings.

Figure 2A:
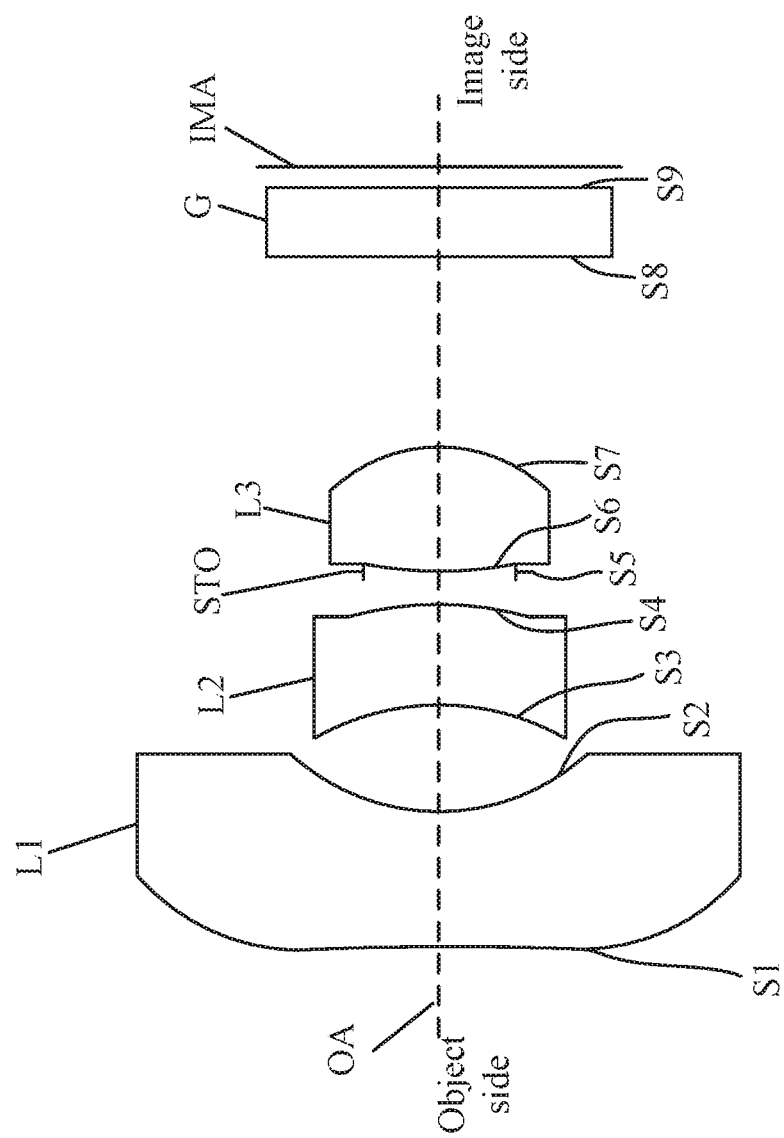
FIG. 2A is a schematic diagram showing an optical lens according to a first embodiment of the present invention.
Figure 2C:
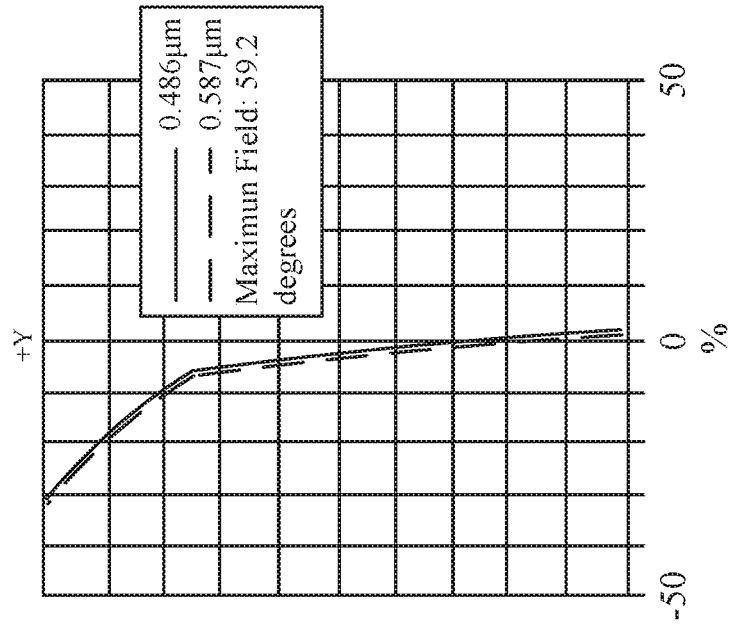
FIGS. 2B to 2D are diagrams illustrating field curvature, distortion and transverse chromatic aberration according to the first embodiment of the present invention, respectively.
Figure 2B:
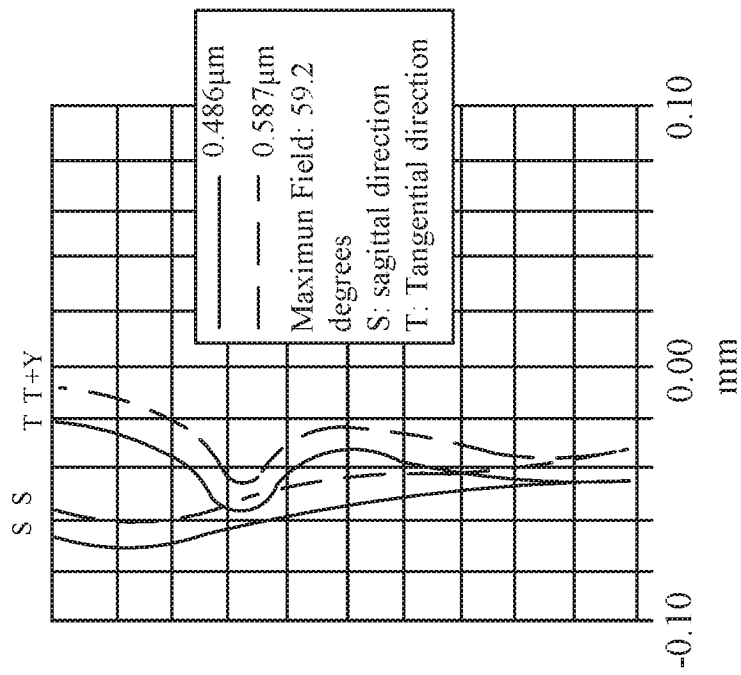
Figure 2D:
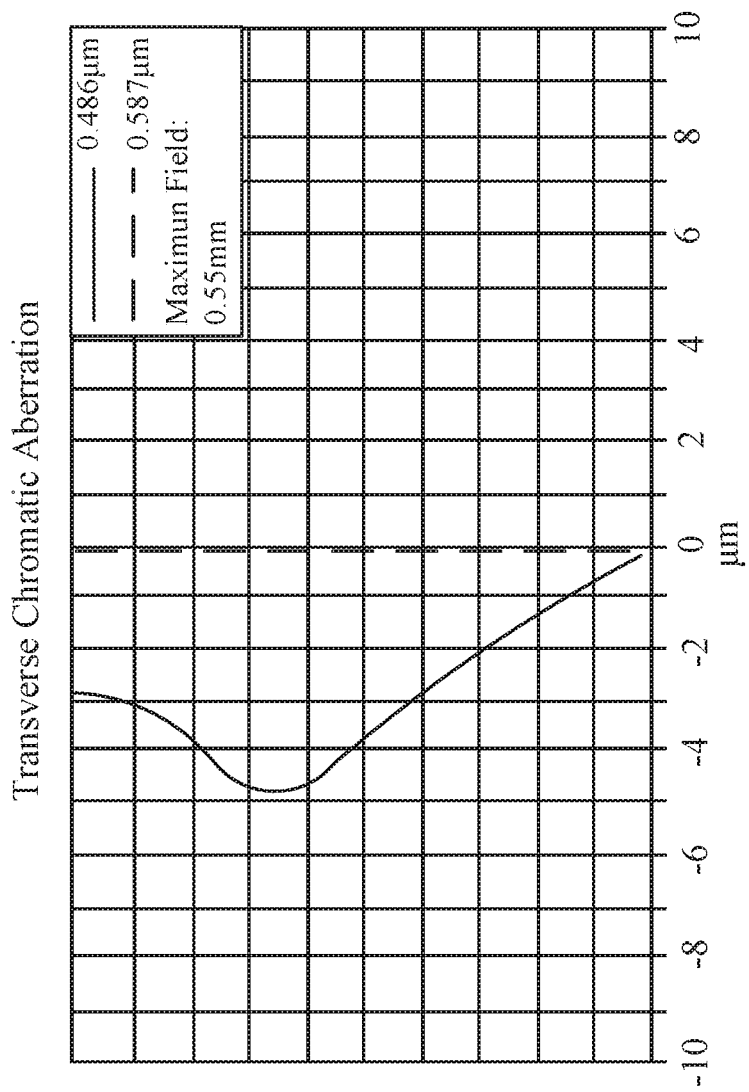

Please refer to FIGS. 2A to 2D. FIG. 2A is a schematic diagram showing an optical lens according to a first embodiment of the present invention and FIGS. 2B to 2D are diagrams illustrating field curvature, distortion and transverse chromatic aberration according to the first embodiment of the present invention, respectively. Referring to FIG. 2A, the optical lens of the first embodiment of the present embodiment includes, in an order from an object side to an image side along an optical axis OA, a first lens L1 having negative refractive power, a second lens L2 having positive refractive power, an aperture stop STO, a third lens L3 having positive refractive power and a protective glass (or a filter) G. Specifically, the object-side surface S1 of the first lens L1 is concave, the image-side surface S2 of the first lens L1 is concave, the first lens L1 is a biconcave lens, and the object-side surface S1 of the first lens L1 has a point of inflection; the object-side surface S3 of the second lens L2 is concave, the image-side surface S4 of the second lens L2 is convex, and the second lens L2 is a meniscus lens; the object-side surface S6 of the third lens L3 is convex, the image-side surface S7 of the third lens L3 is convex, and the third lens L3 is a biconvex lens. The object-side surface S8 and the image-side surface S9 of the protective glass (or the filter) G are planes or flat surfaces.

The optical lens of the first embodiment of the present invention satisfies any of the following conditions:

$$0.7 < OD/TTL < 1.2 \quad (1)$$

$$3.2 < D1/IH < 3.8 \quad (2)$$

$$10 < f2/f < 14 \quad (3)$$

$$8.5 < (f1+f2+f3)/f < 15 \quad (4)$$

$$4 < TTL/AAG < 7 \quad (5)$$

$$4 < TTL/f < 7 \quad (6)$$

$$3 < D1/f < 6 \quad (7)$$

$$4 < f/TC23 < 6 \quad (8)$$

$$5 < f2/f3 < 10 \quad (9)$$

$$0.5 < SD/T1 < 1 \quad (10)$$

wherein OD is a distance (i.e., the object distance of an optical system of the optical lens), along the optical axis OA, between the object-side surface S1 of the first lens L1 and a to-be-detected object; TTL is the total length of the optical lens (i.e., a distance, along the optical axis OA, between the object-side surface S1 of the first lens L1 and the image plane IMA); D1 is an optical effective diameter of the first lens L1; IH is a maximum image height (a maximum image round radius) on the image plane IMA carried out by the optical lens; f1 is effective focal length of the first lens L1, f2 is effective focal length of the second lens L2, f3 is effective focal length of the third lens L3, f is effective focal length of the optical lens; AAG is a sum of an air gap, along the optical axis OA, between the first lens L1 and the second lens L2 and an air gap, along the optical axis OA, between the second lens L2 and the third lens L3 (i.e., a sum of the air gaps between the first lens L1 to the third lens L3); TC23 is a distance, along the optical axis OA, between the image-side surface S4 of the second lens L2 and the object-side surface S6 of the third lens L3; SD is a distance, along the optical axis OA, between the aperture stop STO and the image-side surface S7 of the third lens L3; T1 is central thickness of the first lens L1 along the optical axis OA.

By way of the lenses and any of the conditions (1) to (10), the optical lens can be made to have wide-angle and short object distance and is able to reduce aberration and improve image resolving ability.

The parameters of the optical lens shown in FIG. 2A are listed in Table 1. Related parameters of the lenses of the optical lens are listed in Table 2. Related parameters of aspheric surfaces of the lenses shown in Table 2 are listed in Table 3.

TABLE 1

| f(mm) | 0.437 | IH(mm) | 0.55 |
|---|---|---|---|
| F/# | 1.6 | T1(mm) | 0.4254 |
| f1(mm) | −1.441 | T2(mm) | 0.3128 |
| f2(mm) | 5.4267 | T3(mm) | 0.3894 |
| f3(mm) | 0.6619 | T1 + T2 + T3(mm) | 1.1276 |
| OD(mm) | 2.502 | D1(mm) | 1.8516 |
| TTL(mm) | 2.397 | FOV(deg) | 118.5 |
| TC12(mm) | 0.322 | AAG | 0.424 |
| TC23(mm) | 0.102 | SD | 0.377 |

TABLE 2

| Lens No. | Surface Index | Radius of Curvature R (mm) | Thickness/ Distance D (mm) | Refractive Index Nd | Abbe No. Vd |
|---|---|---|---|---|---|
| | Object Surface | INF | 2.502 | | |
| L1 | S1 | −1.593 | 0.425 | 1.65 | 21.5 |
| | S2 | 2.523 | 0.322 | | |
| L2 | S3 | −0.840 | 0.313 | 1.54 | 56.1 |
| | S4 | −0.736 | 0.102 | | |
| STO | S5 | INF | −0.012 | | |
| L3 | S6 | 1.162 | 0.389 | 1.54 | 56.1 |
| | S7 | −0.450 | 0.583 | | |
| G | S8 | INF | 0.210 | 1.52 | 64.2 |
| | S9 | INF | 0.065 | | |

TABLE 3

| Surface Index | K | E4 | E6 | E8 | E10 | E12 |
|---|---|---|---|---|---|---|
| S1 | −3.31E+01 | 6.82E−01 | −2.86E−01 | −5.73E−02 | 3.29E−01 | −2.54E−01 |
| S2 | −1.29E+01 | 2.08E+00 | 5.00E+00 | 2.17E+01 | −1.35E+02 | 7.54E+01 |
| S3 | 0.00E+00 | −3.16E+00 | 2.26E+01 | −3.93E+01 | | |
| S4 | 7.68E−01 | 9.04E−01 | 7.58E+00 | 1.43E+02 | | |
| S5 | | | | | | |
| S6 | −2.78E+01 | −1.02E+00 | 9.01E+01 | −2.09E+03 | 2.00E+04 | −6.52E+04 |
| S7 | −2.37E+00 | −1.01E+00 | −2.04E+01 | 2.15E+02 | −4.38E+02 | −2.07E+03 |

The values calculated based on conditions (1) to (10) for the parameters of the optical lens of the first embodiment are listed in Table 4. It can be seen from Table 4 that the optical lens of the first embodiment satisfies conditions (1) to (10).

TABLE 4

| Condition (1) | 1.04 |
|---|---|
| Condition (2) | 3.37 |
| Condition (3) | 12.42 |
| Condition (4) | 10.64 |
| Condition (5) | 5.65 |
| Condition (6) | 5.49 |
| Condition (7) | 4.24 |
| Condition (8) | 4.28 |
| Condition (9) | 8.20 |
| Condition (10) | 0.89 |

In addition, it can be seen from FIGS. 2B to 2D that optical performance of the optical lens of the first embodiment satisfies the needs. From FIG. 2B, it can be seen that field curvature of the optical lens of the first embodiment is between −0.07 mm and −0.01 mm. From FIG. 2C, it can be seen that distortion of the optical lens of the first embodiment is between −32% and 1%. From FIG. 2D, it can be seen that transverse chromatic aberration of the optical lens of the first embodiment is between −4.9 μm and 0 μm. It is apparent that the field curvature, distortion and transverse chromatic aberration of the optical lens of the first embodiment can be corrected effectively and resolution can satisfy the needs, thereby obtaining better optical performance.

Figure 3A:
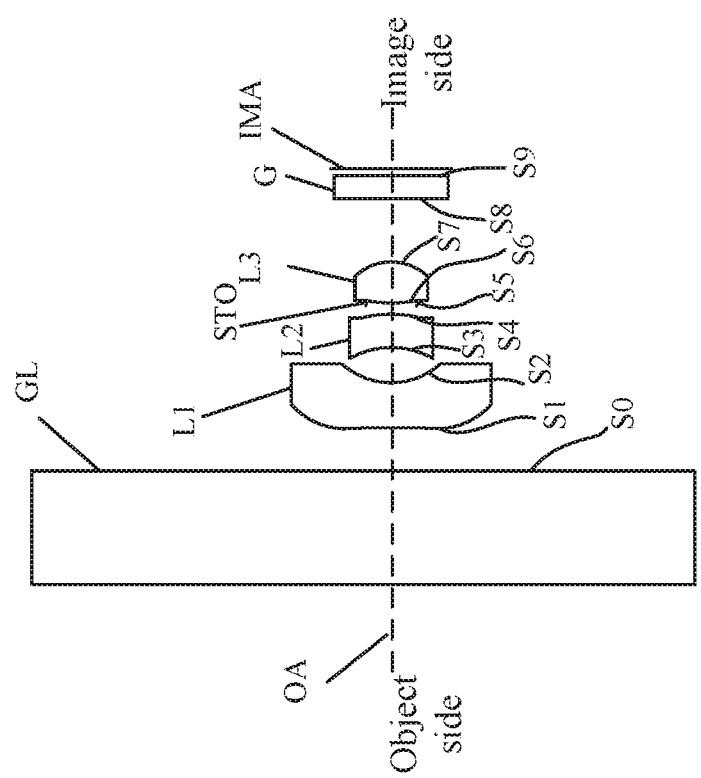
FIG. 3A is a schematic diagram showing an optical lens according to a second embodiment of the present invention.
Figure 3C:
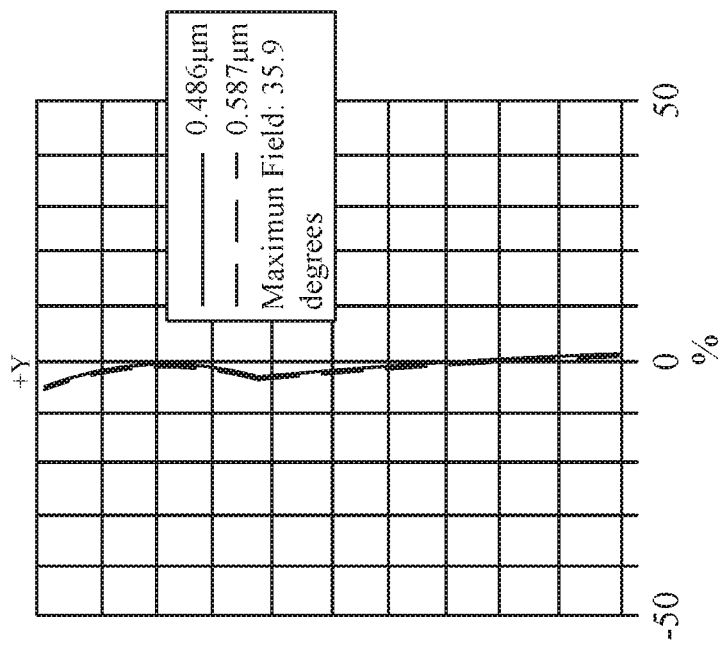
FIGS. 3B to 3D are diagrams illustrating field curvature, distortion and transverse chromatic aberration according to the second embodiment of the present invention, respectively.
Figure 3B:
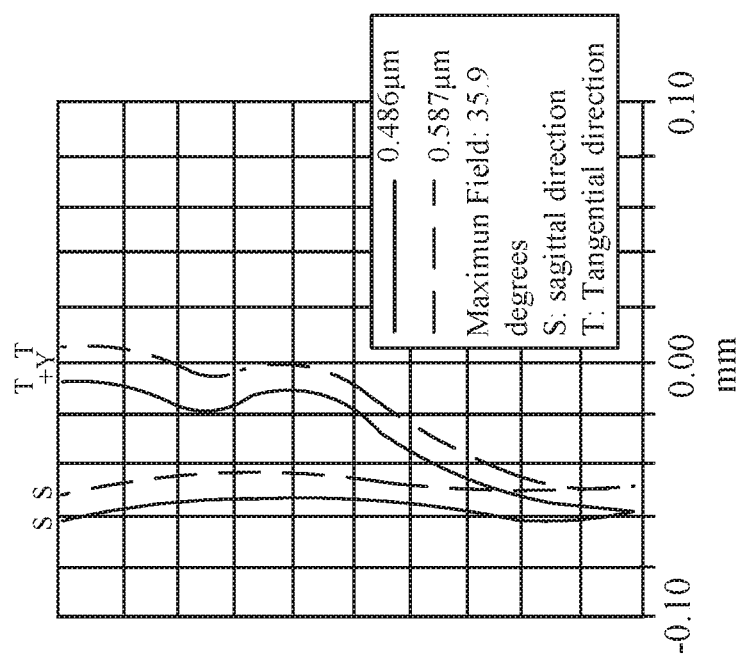
Figure 3D:
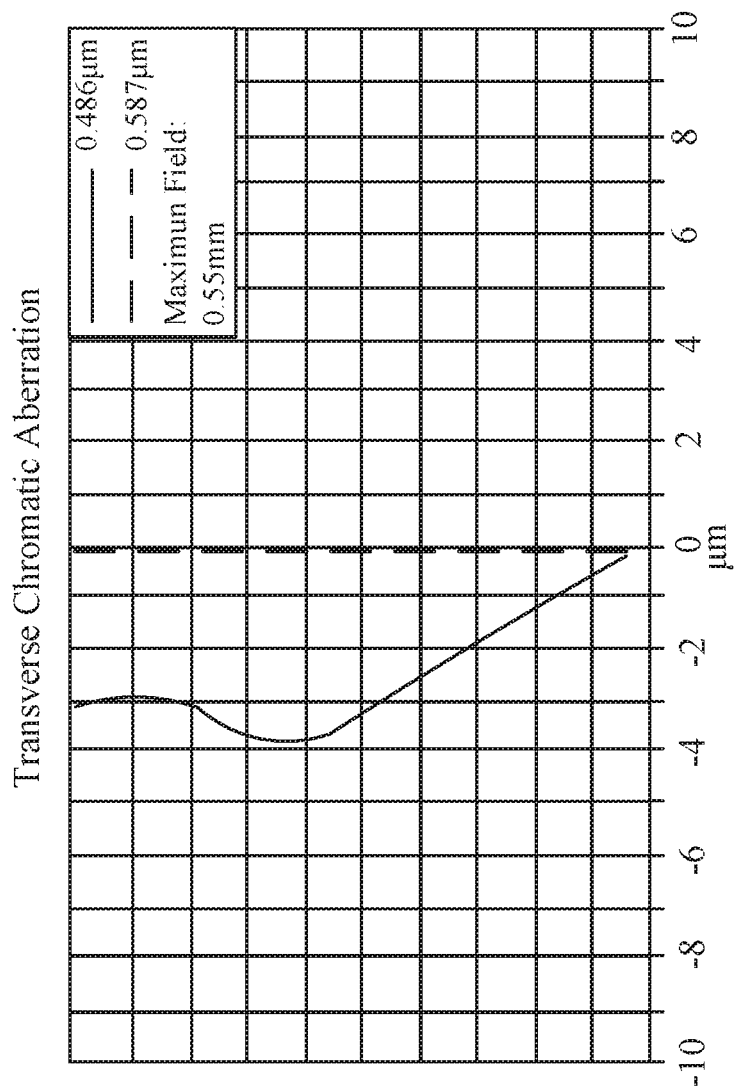

Please refer to FIGS. 3A to 3D. FIG. 3A is a schematic diagram showing an optical lens according to a second embodiment of the present invention and FIGS. 3B to 3D are diagrams illustrating field curvature, distortion and transverse chromatic aberration according to the second embodiment of the present invention, respectively. Refractive power properties and types of the lenses L1, L2 and L3 of the second embodiment of the present invention are similar to that of the first embodiment of the present invention, and are not repeated herein. In the second embodiment of the present invention, along the optical axis OA, a flat transparent member GL is disposed near the object side at a position distanced from the object-side surface S1 of the first lens L1. The optical lens of the second embodiment is a single-focal-point optical lens. In order to form a clear image on the image plane IMA, a to-be-detected object can be placed on the flat transparent member GL to fix the object distance during image formation.

The parameters of the optical lens shown in FIG. 3A are listed in Table 5. Related parameters of the lenses of the optical lens are listed in Table 6. Related parameters of aspheric surfaces of the lenses shown in Table 6 are listed in Table 7.

TABLE 5

| f(mm) | 0.402 | IH(mm) | 0.55 |
|---|---|---|---|
| F/# | 1.6 | T1(mm) | 0.4254 |
| f1(mm) | −1.2812 | T2(mm) | 0.3091 |
| f2(mm) | 5.504 | T3(mm) | 0.3837 |
| f3(mm) | 0.6246 | T1 + T2 + T3(mm) | 1.1182 |
| OD(mm) | 2.502 | D1(mm) | 1.9054 |
| TTL(mm) | 2.3981 | FOV(deg) | 125.6 |
| TC12(mm) | 0.345 | AAG | 0.443 |
| TC23(mm) | 0.098 | SD | 0.376 |

TABLE 6

| Lens No. | Surface Index | Radius of Curvature R (mm) | Thickness/ Distance D (mm) | Refractive Index Nd | Abbe No. Vd |
|---|---|---|---|---|---|
| | Object Surface | INF | 1.500 | 1.52 | 64.2 |
| | S0 | INF | 1.002 | | |
| L1 | S1 | −1.716 | 0.425 | 1.65 | 21.5 |
| | S2 | 1.781 | 0.345 | | |
| L2 | S3 | −0.859 | 0.309 | 1.54 | 56.1 |
| | S4 | −0.749 | 0.098 | | |
| STO | S5 | INF | −0.008 | | |

TABLE 6-continued

| Lens No. | Surface Index | Radius of Curvature R (mm) | Thickness/ Distance D (mm) | Refractive Index Nd | Abbe No. Vd |
|---|---|---|---|---|---|
| L3 | S6 | 1.137 | 0.384 | 1.54 | 56.1 |
|  | S7 | −0.418 | 0.570 |  |  |
| G | S8 | INF | 0.210 | 1.52 | 64.2 |
|  | S9 | INF | 0.065 |  |  |

TABLE 7

| Surface Index | K | E4 | E6 | E8 | E10 | E12 |
|---|---|---|---|---|---|---|
| S1 | −4.08E+01 | 7.05E−01 | −3.07E−01 | −7.05E−02 | 3.19E−01 | −2.30E−01 |
| S2 | 7.91E+00 | 2.40E+00 | 4.99E+00 | 1.97E+01 | −1.52E+02 | 6.50E+01 |
| S3 | 0.00E+00 | −3.02E+00 | 2.49E+01 | −4.88E+01 |  |  |
| S4 | −1.96E+00 | 1.71E+00 | −1.30E+01 | 4.05E+02 |  |  |
| S5 |  |  |  |  |  |  |
| S6 | −2.05E+01 | −6.90E−01 | 7.83E+01 | −2.01E+03 | 2.47E+04 | −1.12E+05 |
| S7 | −2.32E+00 | −9.56E−01 | −1.31E+01 | 2.00E+02 | −1.44E+03 | 5.06E+03 |

The values calculated based on conditions (1) to (10) for the parameters of the optical lens of the second embodiment are listed in Table 8. It can be seen from Table 8 that the optical lens of the second embodiment satisfies conditions (1) to (10).

TABLE 8

| Condition (1) | 1.04 |
|---|---|
| Condition (2) | 3.46 |
| Condition (3) | 13.69 |
| Condition (4) | 12.06 |
| Condition (5) | 5.41 |
| Condition (6) | 5.97 |
| Condition (7) | 4.74 |
| Condition (8) | 4.10 |
| Condition (9) | 8.81 |
| Condition (10) | 0.88 |

In addition, it can be seen from FIGS. 3B to 3D that optical performance of the optical lens of the second embodiment satisfies the needs. From FIG. 3B, it can be seen that field curvature of the optical lens of the second embodiment is between −0.061 mm and −0.01 mm. From FIG. 3C, it can be seen that distortion of the optical lens of the second embodiment is between −5% and 0%. From FIG. 3D, it can be seen that transverse chromatic aberration of the optical lens of the second embodiment is between −3.9 μm and 0 μm. It is apparent that the field curvature, distortion and transverse chromatic aberration of the optical lens of the second embodiment can be corrected effectively and resolution can satisfy the needs, thereby obtaining better optical performance.

Figure 4A:
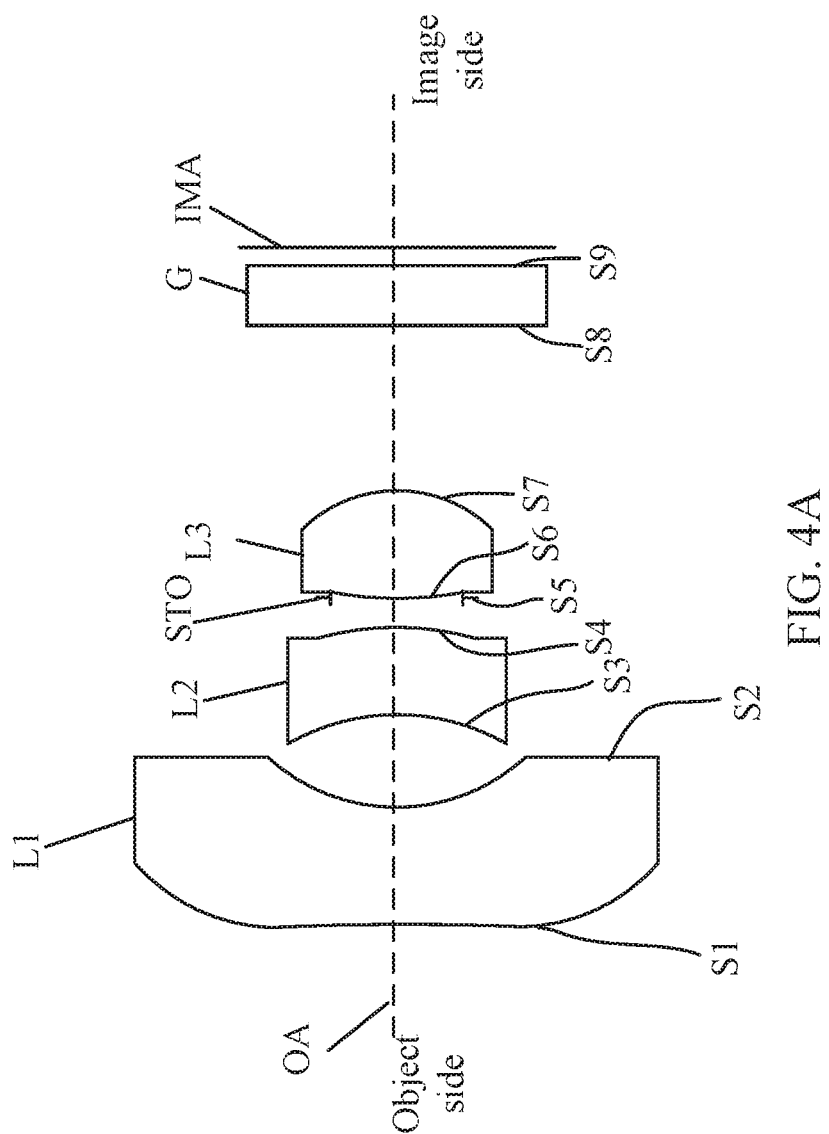
FIG. 4A is a schematic diagram showing an optical lens according to a third embodiment of the present invention.
Figure 4C:
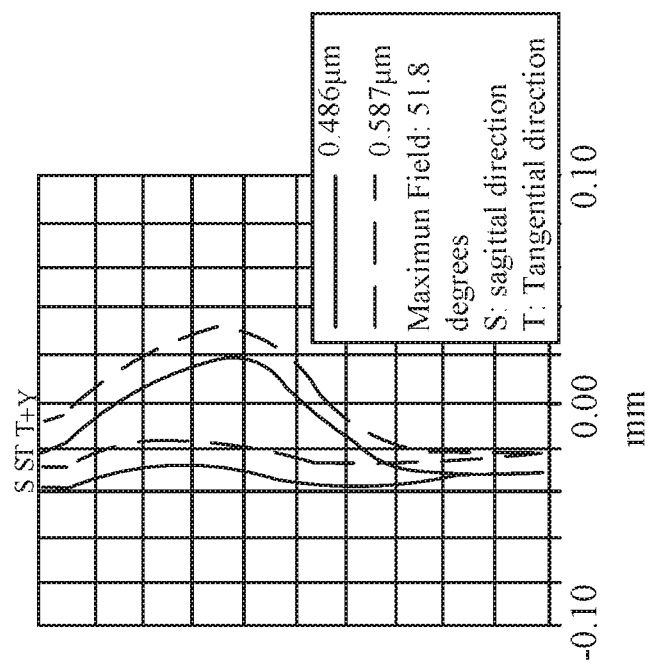
FIGS. 4B to 4D are diagrams illustrating field curvature, distortion and transverse chromatic aberration according to the third embodiment of the present invention, respectively.
Figure 4B:
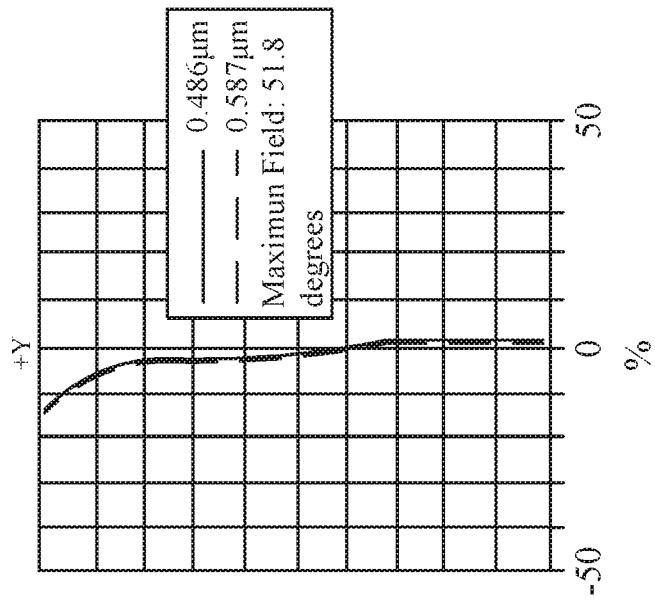
Figure 4D:
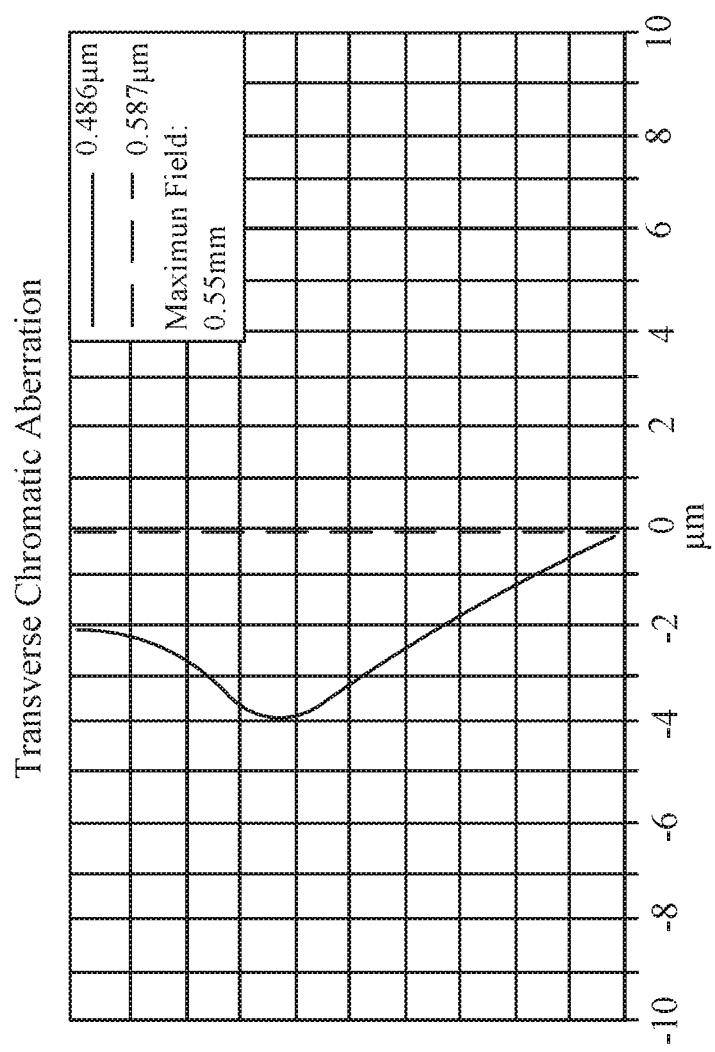

Please refer to FIGS. 4A to 4D. FIG. 4A is a schematic diagram showing an optical lens according to a third embodiment of the present invention and FIGS. 4B to 4D are diagrams illustrating field curvature, distortion and transverse chromatic aberration according to the third embodiment of the present invention, respectively. Refractive power properties and types of the lenses L1, L2 and L3 of the third embodiment of the present invention are similar to that of the first embodiment of the present invention, and are not repeated herein.

The parameters of the optical lens shown in FIG. 4A are listed in Table 9. Related parameters of the lenses of the optical lens are listed in Table 10. Related parameters of aspheric surfaces of the lenses shown in Table 10 are listed in Table 11.

TABLE 9

| f(mm) | 0.445 | IH(mm) | 0.55 |
|---|---|---|---|
| F/# | 1.6 | T1(mm) | 0.449 |
| f1(mm) | −1.619 | T2(mm) | 0.337 |
| f2(mm) | 5.087 | T3(mm) | 0.385 |
| f3(mm) | 0.689 | T1 + T2 + T3(mm) | 1.171 |
| OD(mm) | 2.198 | D1(mm) | 1.856 |
| TTL(mm) | 2.469 | FOV(deg) | 103.7 |
| TC12(mm) | 0.342 | AAG | 0.445 |
| TC23(mm) | 0.103 | SD | 0.378 |

TABLE 10

| Lens No. | Surface Index | Radius of Curvature R (mm) | Thickness/ Distance D (mm) | Refractive Index Nd | Abbe No. Vd |
|---|---|---|---|---|---|
|  | Object Surface | INF | 2.198 |  |  |
| L1 | S1 | −1.418 | 0.449 | 1.65 | 21.5 |
|  | S2 | 4.617 | 0.342 |  |  |
| L2 | S3 | −0.866 | 0.337 | 1.54 | 56.1 |
|  | S4 | −0.746 | 0.103 |  |  |
| STO | S5 | INF | −0.007 |  |  |
| L3 | S6 | 1.197 | 0.385 | 1.54 | 56.1 |
|  | S7 | −0.473 | 0.585 |  |  |
| G | S8 |  | 0.210 | 1.52 | 64.2 |
|  | S9 |  | 0.065 |  |  |

TABLE 11

| Surface Index | K | E4 | E6 | E8 | E10 | E12 |
|---|---|---|---|---|---|---|
| S1 | −3.47E+01 | 7.11E−01 | −2.65E−01 | −5.76E−02 | 3.21E−01 | −1.47E−01 |
| S2 | 1.03E+00 | 2.18E+00 | 5.91E+00 | 2.35E+01 | −1.35E+02 | 3.98E+01 |
| S3 | 0.00E+00 | −3.07E+00 | 2.35E+01 | −4.58E+01 |  |  |
| S4 | −3.88E−01 | 1.35E+00 | 5.60E+00 | 1.67E+02 |  |  |
| S5 |  |  |  |  |  |  |
| S6 | −1.76E+01 | −6.65E−01 | 9.40E+01 | −2.01E+03 | 2.03E+04 | −7.91E+04 |
| S7 | −2.80E+00 | −7.56E−01 | −2.24E+01 | 2.37E+02 | −1.44E+02 | −3.09E+03 |

The values calculated based on conditions (1) to (10) for the parameters of the optical lens of the third embodiment are listed in Table 12. It can be seen from Table 12 that the optical lens of the third embodiment satisfies conditions (1) to (10).

TABLE 12

| | |
|---|---|
| Condition (1) | 0.89 |
| Condition (2) | 3.37 |
| Condition (3) | 11.43 |
| Condition (4) | 9.34 |
| Condition (5) | 5.55 |
| Condition (6) | 5.55 |
| Condition (7) | 4.17 |
| Condition (8) | 4.32 |
| Condition (9) | 7.38 |
| Condition (10) | 0.84 |

In addition, it can be seen from FIGS. 4B to 4D that optical performance of the optical lens of the third embodiment can also satisfy the needs. From FIG. 4B, it can be seen that field curvature of the optical lens of the third embodiment is between −0.04 mm and −0.03 mm. From FIG. 4C, it can be seen that distortion of the optical lens of the third embodiment is between −15% and 0%. From FIG. 4D, it can be seen that transverse chromatic aberration of the optical lens of the third embodiment is between −4 μm and 0 μm. It is apparent that the field curvature, distortion and transverse chromatic aberration of the optical lens of the third embodiment can be corrected effectively and resolution can satisfy the needs, thereby obtaining better optical performance.

Figure 5A:
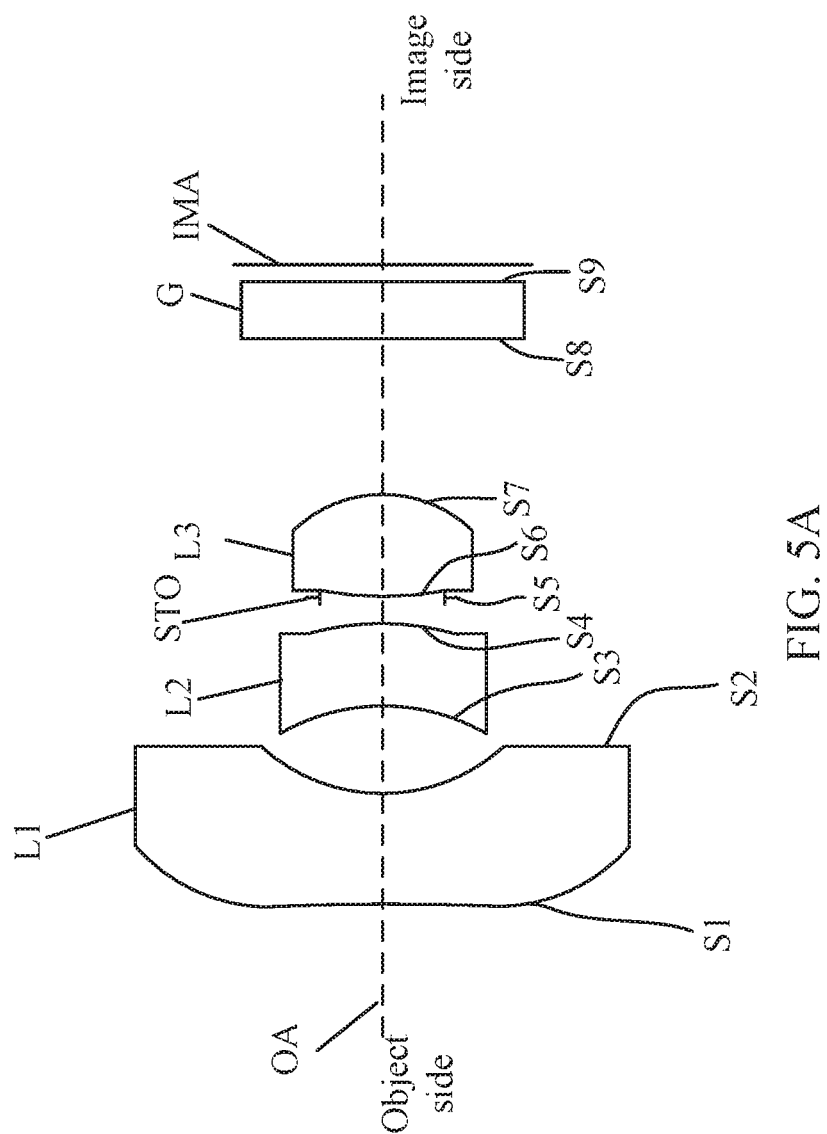
FIG. 5A is a schematic diagram showing an optical lens according to a fourth embodiment of the present invention.
Figure 5D:
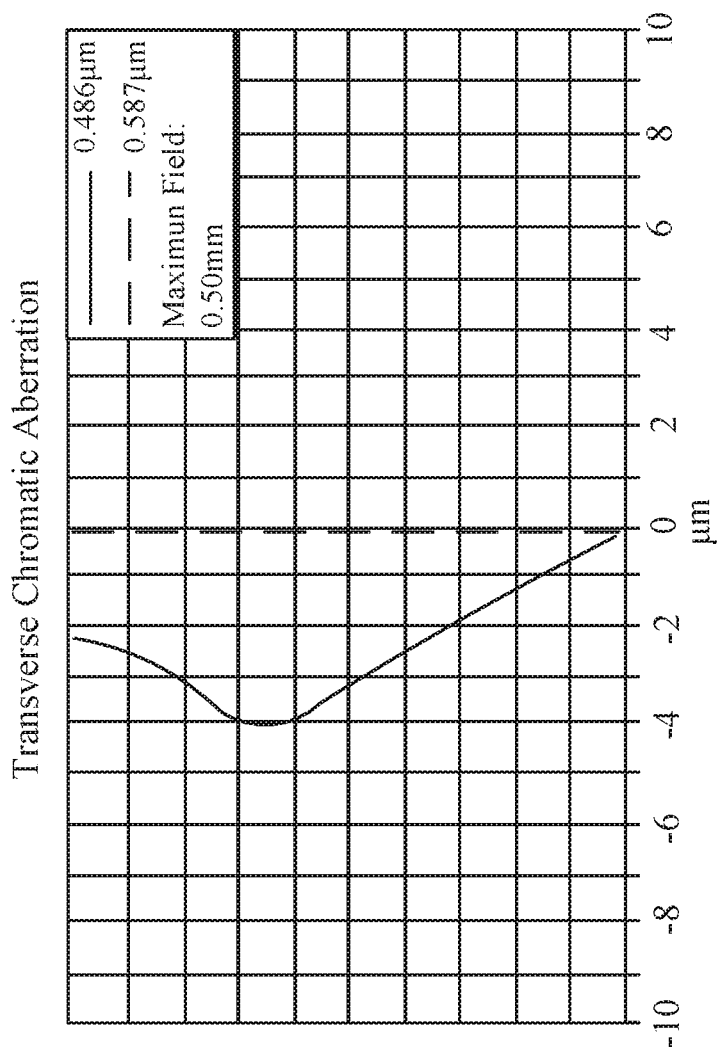

Please refer to FIGS. 5A to 5D. FIG. 5A is a schematic diagram showing an optical lens according to a fourth embodiment of the present invention and FIGS. 5B to 5D are diagrams illustrating field curvature, distortion and transverse chromatic aberration according to the fourth embodiment of the present invention, respectively. Refractive power properties and types of the lenses L1 L2 and L3 of the fourth embodiment of the present invention are similar to that of the first embodiment of the present invention, and are not repeated herein.

The parameters of the optical lens shown in FIG. 5A are listed in Table 13. Related parameters of the lenses of the optical lens are listed in Table 14. Related parameters of aspheric surfaces of the lenses shown in Table 14 are listed in Table 15.

TABLE 13

| | | | |
|---|---|---|---|
| f(mm) | 0.422 | IH(mm) | 0.5 |
| F/# | 1.6 | T1(mm) | 0.475 |
| f1(mm) | −1.518 | T2(mm) | 0.35 |
| f2(mm) | 4.573 | T3(mm) | 0.433 |
| f3(mm) | 0.683 | T1 + T2 + T3(mm) | 1.258 |
| OD(mm) | 1.918 | D1(mm) | 1.81 |

TABLE 13-continued

| | | | |
|---|---|---|---|
| TTL(mm) | 2.549 | FOV(deg) | 91.4 |
| TC12(mm) | 0.35 | AAG | 0.449 |
| TC23(mm) | 0.099 | SD | 0.422 |

TABLE 14

| Lens No. | Surface Index | Radius of Curvature R (mm) | Thickness/ Distance D (mm) | Refractive Index Nd | Abbe No. Vd |
|---|---|---|---|---|---|
| | Object Surface | INF | 1.918 | | |
| L1 | S1 | −1.377 | 0.475 | 1.65 | 21.5 |
| | S2 | 3.981 | 0.350 | | |
| L2 | S3 | −0.857 | 0.350 | 1.54 | 56.1 |
| | S4 | −0.725 | 0.099 | | |
| STO | S5 | INF | −0.011 | | |
| L3 | S6 | 1.191 | 0.433 | 1.54 | 56.1 |
| | S7 | −0.461 | 0.579 | | |
| G | S8 | | 0.210 | 1.52 | 64.2 |
| | S9 | | 0.065 | | |

TABLE 15

| Surface Index | K | E4 | E6 | E8 | E10 | E12 |
|---|---|---|---|---|---|---|
| S1 | −3.04E+01 | 7.03E−01 | −2.67E−01 | −6.70E−02 | 3.14E−01 | −1.51E−01 |
| S2 | −5.28E+00 | 2.19E+00 | 5.77E+00 | 2.31E+01 | −1.38E+02 | 2.95E+01 |
| S3 | 0.00E+00 | −3.09E+00 | 2.33E+01 | −4.38E+01 | | |
| S4 | −1.50E−01 | 1.28E+00 | 7.79E+00 | 1.21E+02 | | |
| S5 | | | | | | |
| S6 | −1.58E+01 | −6.86E−01 | 9.15E+01 | −2.05E+03 | 2.01E+04 | −6.95E+04 |
| S7 | −2.79E+00 | −7.79E−01 | −2.22E+01 | 2.30E+02 | −2.64E+02 | −2.53E+03 |

The values calculated based on conditions (1) to (10) for the parameters of the optical lens of the fourth embodiment are listed in Table 16. It can be seen from Table 16 that the optical lens of the fourth embodiment satisfies conditions (1) to (10).

TABLE 16

| | |
|---|---|
| Condition (1) | 0.75 |
| Condition (2) | 3.62 |
| Condition (3) | 10.84 |
| Condition (4) | 8.86 |
| Condition (5) | 5.68 |
| Condition (6) | 6.04 |
| Condition (7) | 4.29 |
| Condition (8) | 4.26 |
| Condition (9) | 6.70 |
| Condition (10) | 0.89 |

In addition, it can be seen from FIGS. 5B to 5D that optical performance of the optical lens of the fourth embodiment can also satisfy the needs. From FIG. 5B, it can be seen that field curvature of the optical lens of the fourth embodiment is between −0.07 mm and −0.03 mm. From FIG. 5C, it can be seen that distortion of the optical lens of the fourth embodiment is between −5% and 0%. From FIG. 5D, it can be seen that transverse chromatic aberration of the optical lens of the fourth embodiment is between −4 μm and 0 μm. It is apparent that the field curvature, distortion and transverse chromatic aberration of the optical lens of the fourth embodiment can be corrected effectively and resolution can satisfy the needs, thereby obtaining better optical performance.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An optical lens comprising, in an order from an object side to an image side along an optical axis:
    a first lens, which is a lens having negative refractive power, in which an object-side surface of the first lens is concave;
    a second lens, which is a lens having positive refractive power; and
    a third lens, which is a lens having positive refractive power, in which an image-side surface of the third lens is convex,
    wherein the optical lens satisfies the following condition:

$4<TTL/f<7$, wherein TTL is the total length of the optical lens and f is effective focal length of the optical lens,
    wherein the optical lens further comprises an aperture stop disposed between the second lens and the third lens, wherein the optical lens satisfies the following condition:

$0.5<SD/T1<1$, wherein SD is a distance, along the optical axis, between the aperture stop and the image-side surface of the third lens, and T1 is central thickness of the first lens along the optical axis.

2. The optical lens according to claim 1, wherein at least one of the object-side surface and an image-side surface of the first lens has a point of inflection, and the image-side surface of the first lens is concave, the first lens is a biconcave lens, wherein an object-side surface of the second lens is concave and an image-side surface of the second lens is convex, and the second lens is a meniscus lens.

3. The optical lens according to claim 2, wherein an object-side surface of the third lens is convex, the third lens is a biconvex lens.

4. The optical lens according to claim 1, wherein the optical lens satisfies the following condition:

$3<D1/f<6$, wherein D1 is a larger one of optical effective diameters of the object-side surface and the image-side surface of the first lens and f is effective focal length of the optical lens.

5. The optical lens according to claim 1, wherein the optical lens satisfies the following condition:

$3.2<D1/IH<3.8$, wherein D1 is a larger one of optical effective diameters of the object-side surface and the image-side surface of the first lens and IH is a maximum image height on an image plane carried out by the optical lens.

6. The optical lens according to claim 1, wherein the optical lens satisfies the following condition:

$10<f2/f<14$; and $8.5<(f1+f2+f3)/f<15$, wherein f1 is effective focal length of the first lens, f2 is effective focal length of the second lens, f3 is effective focal length of the third lens, and f is effective focal length of the optical lens.

7. The optical lens according to claim 2, wherein the optical lens satisfies the following condition:

$4<TTL/AAG<7$, wherein TTL is the total length of the optical lens, and AAG is a sum of an air gap, along the optical axis, between the first lens and the second lens and an air gap, along the optical axis, between the second lens and the third lens.

8. The optical lens according to claim 7, wherein the optical lens satisfies the following condition:

$0.7<OD/TTL<1.2$, wherein OD is a distance, along the optical axis, between the object-side surface of the first lens and a to-be-detected object, and TTL is the total length of the optical lens.

9. The optical lens according to claim 1, wherein the optical lens satisfies the following condition:

$5<f2/f3<10$, wherein f2 is effective focal length of the second lens and f3 is effective focal length of the third lens.

10. The optical lens according to claim 9, wherein the optical lens satisfies the following condition:

$4<f/TC23<6$, wherein f is effective focal length of the optical lens and TC23 is a distance, along the optical axis, between an image-side surface of the second lens and an object-side surface of the third lens.

11. An optical lens comprising, in an order from an object side to an image side along an optical axis:
    a first lens, which is a lens having negative refractive power, in which an object-side surface of the first lens is concave;
    a second lens, which is a lens having positive refractive power, in which an image-side surface of the second lens is convex; and
    a third lens, which is a lens having positive refractive power, in which an image-side surface of the third lens is convex,
    wherein the optical lens satisfies the following condition:

$3<D1/f<6$, wherein D1 is a larger one of optical effective diameters of the object-side surface and the image-side surface of the first lens and f is effective focal length of the optical lens,
    wherein the optical lens satisfies the following condition:

$4<f/TC23<6$, wherein f is the effective focal length of the optical lens, and TC23 is a distance, along the optical axis, between the image-side surface of the second lens and an object-side surface of the third lens.

12. The optical lens according to claim 11, wherein at least one of the object-side surface and an image-side surface of the first lens has a point of inflection, and the image-side surface of the first lens is concave, the first lens is a biconcave lens; an object-side surface of the second lens is concave, the second lens is a meniscus lens; an object-side surface of the third lens is convex, the third lens is a biconvex lens.

13. The optical lens according to claim 11, wherein the optical lens satisfies the following condition:

$0.7<OD/TTL<1.2$, wherein OD is a distance, along the optical axis, between the object-side surface of the first lens and a to-be-detected object, and TTL is the total length of the optical lens.

14. The optical lens according to claim 13, wherein the optical lens satisfies the following condition:

$3.2<D1/IH<3.8$, wherein D1 is the larger one of the optical effective diameters of the object-side surface and the image-side surface of the first lens and IH is a maximum image height on an image plane carried out by the optical lens.

15. The optical lens according to claim 12, wherein the optical lens satisfies the following condition:

$8.5<(f1+f2+f3)/f<15$, wherein f1 is effective focal length of the first lens, f2 is effective focal length of the second lens, f3 is effective focal length of the third lens, and f is effective focal length of the optical lens.

16. The optical lens according to claim 11, wherein the optical lens satisfies the following condition:

$4<TTL/f<7$, wherein TTL is the total length of the optical lens and f is effective focal length of the optical lens.

17. The optical lens according to claim 11, wherein the optical lens satisfies the following condition:

$10<f2/f<14$; and $5<f2/f3<10$, wherein f2 is effective focal length of the second lens, f3 is effective focal length of the third lens, and f is effective focal length of the optical lens.

18. The optical lens according to claim 11, wherein the optical lens satisfies the following condition:

$4<TTL/AAG<7$ wherein TTL is the total length of the optical lens, AAG is a sum of an air gap, along the optical axis, between the first lens and the second lens and an air gap, along the optical axis, between the second lens and the third lens, wherein the optical lens further comprises an aperture stop disposed between the second lens and the third lens, wherein the optical lens satisfies the following condition:

$0.5<SD/T1<1$, wherein SD is a distance, along the optical axis, between the aperture stop and the image-side surface of the third lens, and T1 is central thickness of the first lens along the optical axis.

19. An optical lens comprising, in an order from an object side to an image side along an optical axis:

a first lens, which is a lens having negative refractive power, in which an object-side surface of the first lens is concave;

a second lens, which is a lens having positive refractive power, in which an image-side surface of the second lens is convex; and a third lens, which is a lens having positive refractive power, in which an image-side surface of the third lens is convex, wherein the optical lens satisfies the following condition:

$0.7<OD/TTL<1.2$, wherein OD is a distance, along the optical axis, between the object-side surface of the first lens and a to-be-detected object, and TTL is the total length of the optical lens.

20. The optical lens according to claim 17, wherein the optical lens satisfies at least one of the following conditions:

$4<TTL/f<7$, $0.5<SD/T1<1$, $3<D1/f<6$, $3.2<D1/IH<3.8$, $10<f2/f<14$ $8.5<(f1+f2+f3)/f<15$, $4<TTL/AAG<7$, $4<f/TC23<6$ $5<f2/f3<10$, wherein TTL is the total length of the optical lens, f is effective focal length of the optical lens, SD is a distance, along the optical axis, between a aperture stop disposed between the second lens and the third lens, and the image-side surface of the third lens, T1 is central thickness of the first lens along the optical axis, D1 is a larger one of optical effective diameters of the object-side surface and the image-side surface of the first lens, IH is a maximum image height on an image plane carried out by the optical lens, f1 is effective focal length of the first lens, f2 is effective focal length of the second lens, f3 is effective focal length of the third lens, and f is effective focal length of the optical lens, AAG is a sum of an air gap, along the optical axis, between the first lens and the second lens and an air gap, along the optical axis, between the second lens and the third lens, and TC23 is a distance, along the optical axis, between an image-side surface of the second lens and an object-side surface of the third lens.

* * * * *